US012752562B2

(12) United States Patent
Shingary et al.

(10) Patent No.: US 12,752,562 B2
(45) **Date of Patent: *Oct. 6, 2026**

(54) UV/LED PRINTING AND FINISHING PROCESS

(71) Applicant: NFSC Holdings, LLC, Stuart, FL (US)

(72) Inventors: Casey R. Shingary, Stuart, FL (US); Gustavo Lopez, Parkland, FL (US); Samuel J. Ferguson, Vero Beach, FL (US)

(73) Assignee: NFSC Holdings, LLC, Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,382

(22) Filed: May 28, 2024

(65) Prior Publication Data

US 2024/0308258 A1 Sep. 19, 2024

Related U.S. Application Data

(63) Continuation of application No. 16/781,525, filed on Feb. 4, 2020, now Pat. No. 11,993,092.

(60) Provisional application No. 62/800,846, filed on Feb. 4, 2019.

(51) Int. Cl.

| | |
|---|---|
| ***B41M 5/00*** | (2006.01) |
| ***B41J 3/407*** | (2006.01) |
| ***B41J 11/00*** | (2006.01) |
| ***B41M 7/00*** | (2006.01) |
| ***C09D 11/101*** | (2014.01) |
| *B05D 3/06* | (2006.01) |

(Continued)

(52) U.S. Cl.

CPC ............ *B41M 5/0011* (2013.01); *B41J 3/407* (2013.01); *B41J 11/00214* (2021.01); *B41M 5/0041* (2013.01); *B41M 5/0047* (2013.01); *B41M 5/0064* (2013.01); *B41M 7/0027* (2013.01); *B41M 7/0036* (2013.01); *B41M 7/0081* (2013.01); *C09D 11/101* (2013.01); *B05D 3/067* (2013.01); *B05D 3/12* (2013.01); *B41J 11/0015* (2013.01); *B41M 7/0045* (2013.01); *H05H 1/24* (2013.01)

(58) Field of Classification Search

CPC ............ B05D 2201/00; B05D 2252/02; B05D 3/0263; B05D 3/067; B05D 3/12; B05D 3/144; B05D 7/536; B41J 11/0015; B41J 11/00214; B41J 3/407; B41M 5/0011; B41M 5/0041; B41M 5/0047; B41M 5/0064; B41M 7/0027; B41M 7/0036; B41M 7/0045; B41M 7/0081; C09D 11/10; C09D 11/101; C09D 11/30; H05H 1/24; H05H 1/47

See application file for complete search history.

*Primary Examiner* — Sonya M Sengupta

(74) *Attorney, Agent, or Firm* — Greenberg Traurig, P.A.; Mammen ("Roy") P. Zachariah

(57) ABSTRACT

A UV/LED printing and finishing process is disclosed. The printing and finishing process improves the manner in which printing, permanent bonding, and finishing is performed on products containing low surface energy plastics, such as high-density polyethylene furniture. The process includes abrading a surface of the low surface energy plastic and then applying a corona or plasma treatment to the surface of the low surface energy plastic to increase the adhesion capabilities of the surface. Once the surface has been treater, the process may include printing a polymer ink onto the surface of the low surface energy plastic, such as by utilizing a UV/LED flatbed or hybrid printer. The process may also include curing the printed surface of the low surface energy (Continued)

plastic, and then finally applying a clear inorganic top coating onto the printed surface to protect the UV/LED cured polymer ink.

15 Claims, 7 Drawing Sheets

(51) Int. Cl.
*B05D 3/12* (2006.01)
*H05H 1/24* (2006.01)

UV/LED PRINTING AND FINISHING PROCESS

CROSS-REFERENCE TO RELATED APPLICATION(S)

This application is a continuation of U.S. patent application Ser. No. 16/781,525, filed on Feb. 4, 2020, which claims priority to and claims the benefit of U.S. Provisional Patent Application No. 62/800,846, filed on Feb. 4, 2019, the disclosures of which are herein incorporated by reference in their entireties.

FIELD OF THE INVENTION

The present application relates to abrading technologies, surface modification technologies, printing technologies, adhesion technologies, curing technologies, and finishing processes, and more particularly, to a system and method for providing ultraviolet light emitting diode ("UV/LED") printing and finishing processes.

BACKGROUND

Currently, systems, methods, and techniques exist for adhering coatings and inks onto the surfaces of various types of plastic. Notably, however, such systems, methods, and techniques do not allow for such coatings and/or inks to be permanently bonded, adhered, and/or finished onto plastic surfaces because of low surface tension. For example, with regard to low-surface energy plastics, it is very difficult to paint or bond anything to the surface of such plastics. While current technologies and methodologies provide for many benefits and efficiencies, such technologies and methodologies still have many shortcomings. As a result, current methodologies and technologies may be modified and/or enhanced so as to provide enhanced bonding, adhesion, and durability when applying coatings and/or inks to low-surface energy plastics. Such enhancements and improvements to methodologies and technologies may provide for improved customer and manufacturer satisfaction, reduced costs, enhanced decorative design capabilities when applying coatings and/or inks to low-surface energy plastics, and increased ease-of-uses.

SUMMARY

A system and accompanying methods for conductive a UV/LED printing and finishing process are disclosed. In particular, the system and methods solve problems associated with bonding or adhering a printing ink onto the surface of an object containing low-surface energy plastics, such as, but not limited to, high-density polyethylene, thermoplastic polyolefin, polypropylene, any other low surface energy plastics, or a combination thereof. The system and methods facilitate the bonding or adhering of the ink onto the surface of the object by utilizing corona or plasma surface modification treatments on the surface of the object. The corona or plasma surface modification treatments facilitate a permanent bond or adhesion of a polymer ink, such as UV/LED ink, onto the surface of the object containing the low-surface energy plastic. Based on the corona or plasma surface modification treatment, the system and methods allow for decorative UV/LED printing and finishing onto the surfaces of objects containing low-surface energy plastics.

In certain embodiments, the system and methods provide a suitable surface modification technology process on low-surface energy plastic furniture members or sheet stock designed to permanently bond and adhere UV/LED ink, such as by utilizing flatbed printing and/or hybrid UV/LED printing. The processes facilitated and/or performed by the system and method provide the foundation for a permanent UV/LED printing process application, which may then be followed by a clear top coat application of a coating to provide a durable and permanent finishing to the furniture members or sheet stock including the low-surface energy plastic. In certain embodiments, the clear top coating may be inorganic silicon dioxide, which may provide a durable and permanent finish to the furniture members and/or sheet stock.

In certain embodiments, the system and methods initially include conducting an abrading step on the plastic surfaces of an object. The abrading step, for example, may include performing sanding, media blasting, Scotch-Brite™, and/or other abrading techniques on the plastic surfaces of the object. The system and methods may then include performing a surface modification process on the plastic surfaces of the object. For example, the system and methods may include performing a corona or plasma surface modification treatment on the plastic surfaces of the object. Once the surfaces have been treated using the corona or plasma surface modification treatment, the system and methods may include printing and/or depositing polymer ink onto the plastic surfaces of the object. For example, a UV/LED printer may be utilized to print the polymer ink onto the plastic surfaces of the object in a decorative pattern. In certain embodiments, once the polymer ink is printed onto the plastic surfaces, the system and methods may include curing the polymer ink printed on the plastic surfaces, such as by utilizing a high energy UV lamp to fully cure the polymer ink. In certain embodiments, once the curing is performed, the system and methods may include performing a finishing process, which includes applying a clear top coating onto the cured polymer ink to increase durability and to protect the UV/LED cured polymer ink.

In one embodiment, a system for conducting a UV/LED printing and finishing process is provided. The system may include a device and/or componentry configured to perform a surface modification process on a high-density polyethylene member (or other low-surface energy plastic member). In certain embodiments, the surface modification process may be performed to increase an adhesion capability of the high-density polyethylene member. The system may also include a printer configured to print a polymer ink onto the high-density polyethylene member after the surface modification process is performed. The system may further include a device configured to perform a finishing process on the high-density polyethylene member after the polymer ink is printed onto the high-density polyethylene member. In certain embodiments, the finishing process may comprise applying a clear top coating onto a portion of the high-density polyethylene member printed with the polymer ink.

In another embodiment, a method for conducting a UV/LED printing and finishing process is provided. The method may include performing, by utilizing a first device, a surface modification process on a high-density polyethylene member (or other low-surface energy plastic member. In certain embodiments, the surface modification process may be performed to increase an adhesion capability of the high-density polyethylene member. The method may also include depositing, by utilizing a printer, a polymer ink onto the high-density polyethylene member after the surface modification process is performed. Furthermore, the method may include conducting, by utilizing a second device, a finishing process on the high-density polyethylene member after the polymer ink is deposited onto the high-density polyethylene member. The finishing process may comprise applying a clear top coating onto a portion of the high-density polyethylene member.

According to yet another embodiment, another method for conductive a UV/LED printing and finishing process is provided. The method may include abrading a surface of a high-density polyethylene member (or other low-surface energy plastic member. The method may then include performing, by utilizing a first device, a surface modification process on the surface of the high-density polyethylene member. The surface modification process may be performed to increase an adhesion capability of the high-density polyethylene member. Additionally, the method may include printing, by utilizing a printer, a polymer ink onto the surface of the high-density polyethylene member. Furthermore, the method may include curing the polymer ink printed onto the polyethylene member. Moreover, the method may include conducting a finishing process on the high-density polyethylene member after the polymer ink is deposited onto the high-density polyethylene member. In certain embodiments, the finishing process may comprise applying a clear top coating onto a portion of the high-density polyethylene member.

These and other features of the systems and methods for providing a UV/LED printing and finishing process are described in the following detailed description, drawings, and appended claims.

DETAILED DESCRIPTION OF THE DRAWINGS

Figure 1:
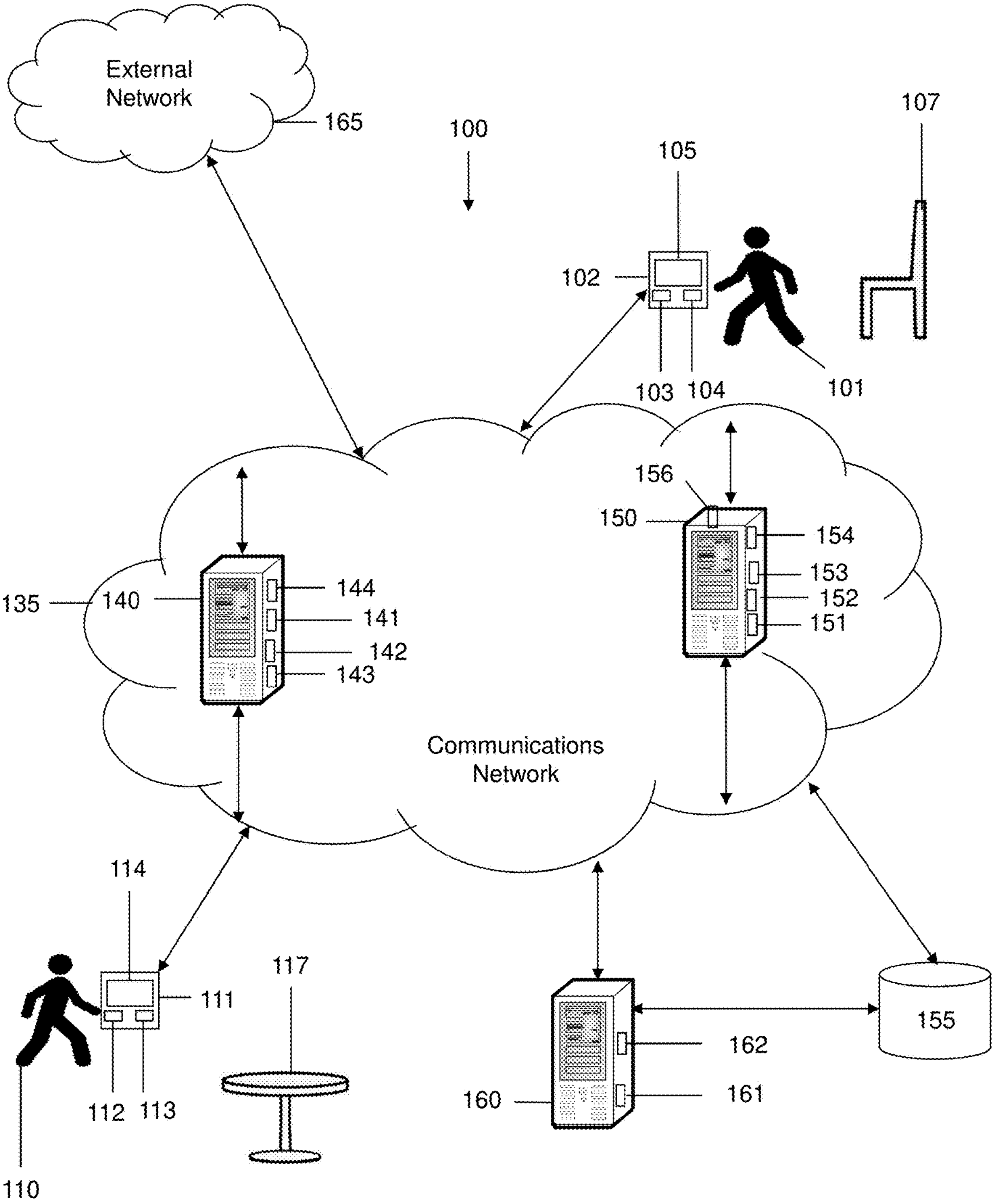
FIG. 1 is a schematic diagram of a system for conducting a UV/LED printing and finishing process according to an embodiment of the present disclosure.

A system 100 and accompanying methods for conductive a UV/LED printing and finishing process are disclosed. In particular, the system 100 and methods solve problems associated with bonding or adhering a printing ink onto the surface of an object containing low-surface energy plastic, such as, but not limited to, high-density polyethylene, thermoplastic polyolefin, polypropylene, any other low surface energy plastics, or a combination thereof. The system 100 and methods facilitate the bonding and/or adhering of the ink onto the surface of the object by utilizing corona and/or plasma surface modification treatments on the surface of the object. The corona or plasma surface modification treatments may facilitate a permanent bond or adhesion of a polymer ink, such as UV/LED ink, onto the surface of the object containing the low-surface energy plastic. Based on the corona or plasma surface modification treatment, the system 100 and methods allow for decorative UV/LED printing and finishing onto the surfaces of objects containing low-surface energy plastics.

In certain embodiments, the system 100 and methods provide a suitable surface modification technology process on low-surface energy plastic furniture members or sheet stock designed to permanently bond and adhere UV/LED ink, such as by utilizing flatbed printing and/or hybrid UV/LED printing. The processes facilitated and/or performed by the system 100 and method provide the foundation for a permanent UV/LED printing process application, which may then be followed by a clear top coat application of a coating to provide a durable and permanent finishing to the furniture members or sheet stock including the low-surface energy plastic. In certain embodiments, the clear top coating may be inorganic silicon dioxide, which may provide a durable and permanent finish to the furniture members and/or sheet stock.

In certain embodiments, the system 100 and methods initially include conducting an abrading step on the plastic surfaces of an object. The abrading step, for example, may include performing sanding, media blasting, and/or other abrading techniques on the plastic surfaces of the object. The system 100 and methods may then include performing a surface modification process on the plastic surfaces of the object. For example, the system 100 and methods may include performing a corona or plasma surface modification treatment on the plastic surfaces of the object. Once the surfaces have been treated using the corona or plasma surface modification treatment, the system 100 and methods may include printing and/or depositing polymer ink onto the plastic surfaces of the object. For example, a UV/LED printer may be utilized to print the polymer ink onto the plastic surfaces of the object in a decorative pattern. In certain embodiments, once the polymer ink is printed onto the plastic surfaces, the system 100 and methods may include curing the polymer ink printed on the plastic surfaces, such as by utilizing a high energy UV lamp to fully cure the polymer ink. In certain embodiments, once the curing is performed, the system 100 and methods may include performing a finishing process, which includes applying a clear top coating onto the cured polymer ink to increase durability and to protect the UV/LED cured polymer ink.

In certain embodiments, the system and methods may further include utilizing adhesion promoters and/or primers after the plasma or corona surface modification treatments to provide the highest level of adhesion of UV/LED printed high-density polyethylene (or other low-surface energy plastic) members or sheet stock. Notably, in certain embodiments, the system 100 and methods provide functionality that overcome the lack of unique designs, availability, printing and/or painting on outdoor low-surface energy plastic furniture or sheet stock being offered and sold in the current market. With the functionality provided by the system 100 and methods, the system 100 and methods offer unique designs, graphics, or logos on such furniture (or other objects) and provide unlimited and innovative design options not currently available in the market and/or by using existing technologies. For example, existing technologies may only allow for solid colors or multi colors with no graphics or logos, and colors incorporated or molded into the extruded high-density polyethylene furniture or sheet stock.

As shown in FIGS. 1-5, a system 100 for conducting UV/LED printing and finishing processes is disclosed. The system 100 may be configured to support, but is not limited to supporting, abrading processes, surface modification processes, printing processes, coating application processes, curing processes, chemical processes, caching services, hybrid cloud services, content delivery services, monitoring services, cloud computing services, satellite services, telephone services, voice-over-internet protocol services (VOIP), software as a service (SaaS) applications, platform as a service (PaaS) applications, gaming applications and services, social media applications and services, operations management applications and services, productivity applications and services, mobile applications and services, and any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. In certain embodiments, the first user 101 may be an individual that seeks to apply decorative inks and/or coatings onto furniture (or any other object), such as, but not limited to, furniture 107, which may be a chair. In certain embodiments, the first user 101 may be a robot, a computer, a program, a process, any type of user, or any combination thereof. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by content and service providers associated with the communications network 135 or any other network in the system 100. In certain embodiments, the second user 110 may be an individual that seeks to also create furniture with decorative inks and/or coatings. For example, the second user 110 may seek to decorate furniture 117, which may be a table, with a decorative coating and/or ink. In further embodiments, the second user 110 may be a robot, a computer, a program, a process, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the second user 110 to interact with various applications executing on the second user device 111 and to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a computing device in FIG. 1.

In certain embodiments, the first user device 102 and/or the second user device 111 may have any number of software applications and/or application services stored and/or accessible thereon. For example, the first user device 102 and/or the second user device 111 may include cloud-based applications, database applications, caching applications, VOIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications may interact with, deactivate, activate, control, and/or instruct the abrading device 202, the surface modification device 204, the printer 206, the coating device 208, and/or the curing device 210. In certain embodiments, the first user device 102, the additional user devices, and/or the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, the second user 110, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 145, 150, 160, the first user device 102, the second user device 111, the abrading device 202, the surface modification device 204, the printer 206, the coating device 208, the curing device 210, any devices in the system 100, any process of the system 100, any program of the system 100, any other device, any network, or any combination thereof.

The database 155 may also store information and metadata obtained from the system 100, store data and metadata associated with operations requested in the system 100, store operations occurring in the system 100, store data and metadata associated with operations conducted by the abrading device 202, the surface modification device 204, the printer 206, the coating device 208, and/or the curing device 210, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, 115 and/or computing device 120, store any information obtained from any of the networks in the system 100, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include an external network 165. The external network 165 may be under the control of a different service provider than communications network 135, any designated user, a computer, another network, or a combination thereof. The external network 165 of the system 100 may be configured to communicate with communications network 135. For example, the communications network 135 may be utilized to communicate with the first user device 102 and to connect with other devices within or outside external network 165. Additionally, the external network 165 may be configured to transmit, generate, and receive any information and data traversing the system 100. Furthermore, the external network 165 may be configured to communicate with the abrading device 202, the surface modification device 204, the printer 206, the coating device 208, and/or the curing device 210. In certain embodiments, the external network 165 may include any number of servers, databases, or other componentry. The external network 165 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. In certain embodiments, the external network 165 may be part of a single autonomous system that is located in a particular geographic region, or be part of multiple autonomous systems that span several geographic regions.

Figure 2:
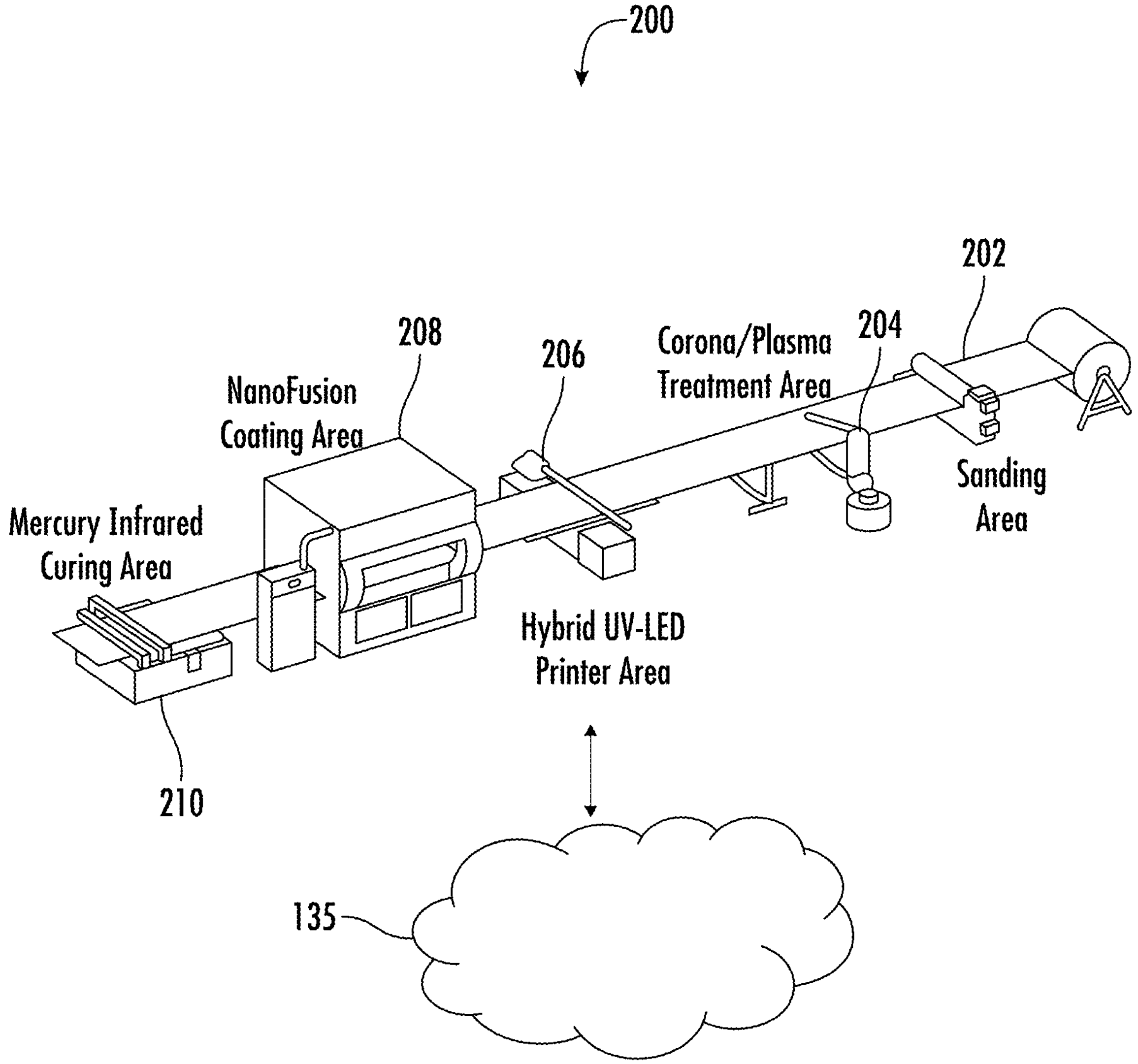
FIG. 2 is a schematic diagram illustrating additional componentry of the system of FIG. 1 for conducting UV/LED printing and finishing processes according to an embodiment of the present disclosure.
Figure 3:
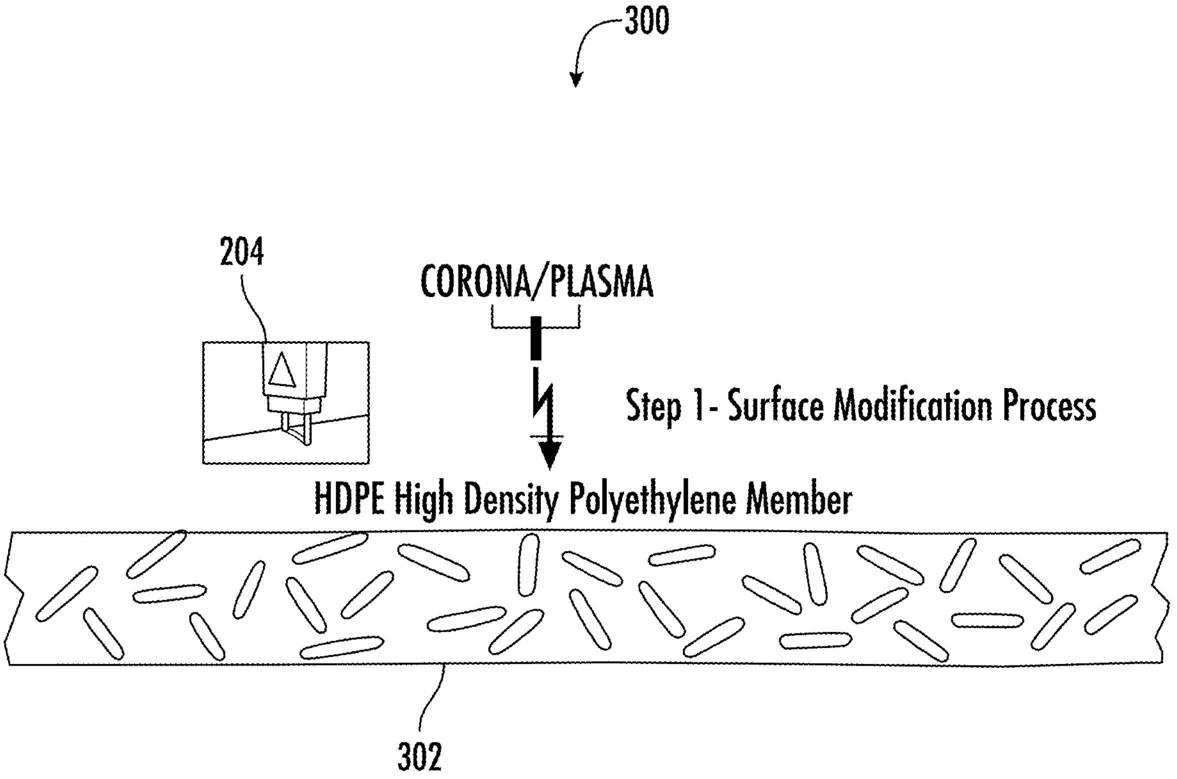
FIG. 3 is a schematic diagram illustrating a surface modification process conducted by the system of FIG. 1 on a member including low surface energy plastic according to an embodiment of the present disclosure.
Figure 4:
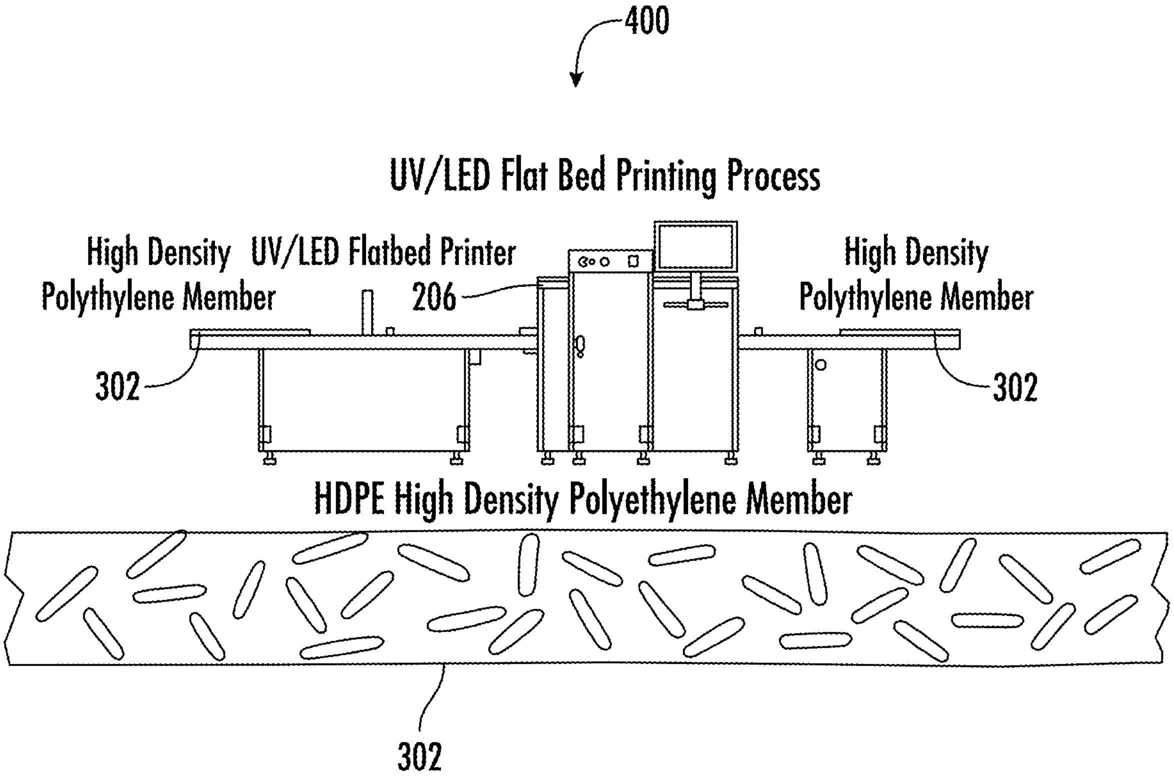
FIG. 4 is a schematic diagram illustrating a UV/LED printing process conducted by the system of FIG. 1 on a member including low surface energy plastic according to an embodiment of the present disclosure.
Figure 5:
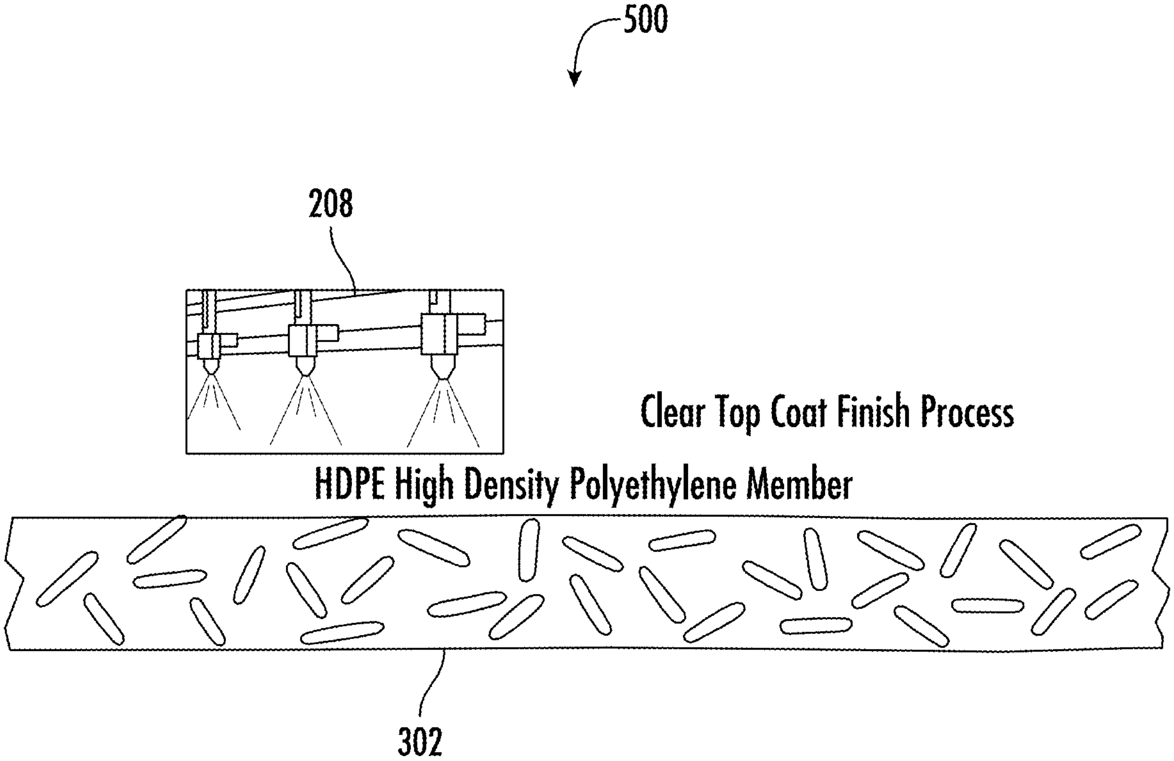
FIG. 5 is a schematic diagram illustrating a finishing process conducted by the system of FIG. 1 on a member including low surface energy plastic according to an embodiment of the present disclosure.

In certain embodiments, the system 100 may include a subsystem 200, which may include an abrading device 202, which may be configured to abrade the surface of an object or member (e.g. member 302), such as the surface of furniture 107 and/or furniture 117. The abrading device 202 may be configured to perform abrading techniques such as, but not limited to sanding, media blasting, and/or Scotch-Brite™ abrading techniques on the surfaces of the furniture 107 and/or furniture 117 (or other object). In certain embodiments, the abrading device 202 may be a wide-belt sander or a Scotch-Brite™ abrading system. Notably, any type of existing abrading device 202 may be utilized. The subsystem 200 may also include a surface modification device 204, which may be located in a treatment area of the subsystem 200, as shown in FIG. 2. The surface modification device 204 may be configured to perform corona surface treatments, plasma surface treatments, any other surface treatments, or a combination thereof, on the surfaces of the furniture 107 and/or furniture 117. In certain embodiments, the surface modification device 204 may be configured to include a plasma head, which takes argon gas and converts the gas into plasma, to facilitate the plasma treatment. In certain embodiments, the surface modification device 204 may include a transformer and/or a bar treater to facilitate the corona treatment. In certain embodiments, the surface modification device 204 can be a robot and/or have robotic arms to facilitate the corona and/or plasma treatment. In certain embodiments, the corona surface treatment may be an existing corona surface treatment, the plasma surface treatment may be any existing plasma treatment, or a combination thereof. In certain embodiments, the corona process may include outputting 30,000-40,000 (or other number) volts of electricity towards the surface of the furniture 107, which may alter the molecules on the surface of the plastic and realign all of the molecules and alter them. In certain embodiments, the corona process is typically only effective for a certain period of time. In particular, in certain embodiments, the corona process allows for a temporary window that allows the surface molecules to accept paints or inks or any type of proper coating material to get a permanent bond and not a temporary bond or sacrificial bond. In certain embodiments, the temporary window could be 15 minutes or even 2 hours or more. As an alternative to using the corona process and as indicated herein, a plasma process may be used. For the plasma process, in certain embodiments, an argon gas beam of light may be configured to go back and forth and over every square inch of the surface of the plastic. In certain embodiments, the plasma process essentially does the same thing as the corona process, but the plasma process may have a little higher penetration into the surface of the plastic and may produce a slightly better bond than the corona process. In certain embodiments, the corona process may be preferentially used because it may be better designed given the type of production desired. In certain embodiments, no primers are involved in these processes.

Once the member is treated via the corona or plasma process, the member may then be directly fed into the printer 206 of the subsystem 200 for application of a polymer ink onto the surface of the member. The printer 206 may be a UV/LED printer, a hybrid UV/LED printer, a flatbed printer, any type of printer or a combination thereof. In certain embodiments, a UV/LED printer may be utilized for application of the polymer ink instead of mercury vapor lamps because mercury vapor lamps reach temperatures, such as 250 degrees Fahrenheit, which may warp the member. In certain embodiments, once the polymer ink is applied to the surface of the member (e.g. member 302), the surface of the member may be subjected to post curing by the curing device 210, which may be any suitable curing device. In certain embodiments, the curing device 210 may be a high energy UV lamp, which may be a mercury (short exposure time) and/or infrared lamp in certain embodiments. Once cured using the curing device 210, the member may be fed to the coating device 208, which may be configured to apply a clear top coating onto the surface of the member that has the polymer ink deposited thereon to finish off the process. In certain embodiment, the coating device 208 may include a reciprocator spray system (or other spray system), which be configured to apply the coating onto the surface of the member. In certain embodiments, the curing device 210 may be configured to cure the polymer ink applied onto the surface of the member prior to providing the member to the coating device 208 for application of the top clear coating. In certain embodiments, the curing device 210 may be configured to cure the polymer ink applied onto the surface of the member prior to providing the member to the coating device for application of the top clear coating and also configured to cure the surface of the member after application of the top clear coating onto the member.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, abrading surfaces of an object containing low surface energy plastic; performing surface modification processes on the object containing low surface energy plastic; printing and/or depositing polymer ink onto a surface of the object containing the low surface energy plastic; curing the polymer ink printed and/or deposited on the surface of the object containing the low surface energy plastic; performing a finishing process on the object containing the low surface energy plastic by applying a clear top coating onto the surface of the object; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100. In certain embodiments, the server 160 may include any number of program modules, which may include software for conducting the various operations performed by the server 160.

Although FIGS. 1-5 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 145, a server 150, a server 160, a database 155, an external network 165, an abrading device 202, a surface modification device 204, a printer 206, a coating device 208, and a curing device 210. However, the system 100 may include multiple first user devices 102, multiple second user devices 111, multiple communications networks 135, multiple servers 140, multiple servers 145, multiple servers 150, multiple servers 160, multiple databases 155, multiple external networks 165, multiple abrading devices 202, multiple surface modification devices 204, multiple printers 206, multiple coating devices 208, multiple curing devices 210, or any number of any of the other components inside or outside the system 100. Furthermore, in certain embodiments, substantial portions of the functionality and operations of the system 100 may be performed by other networks and systems that may be connected to system 100.

Figure 6:
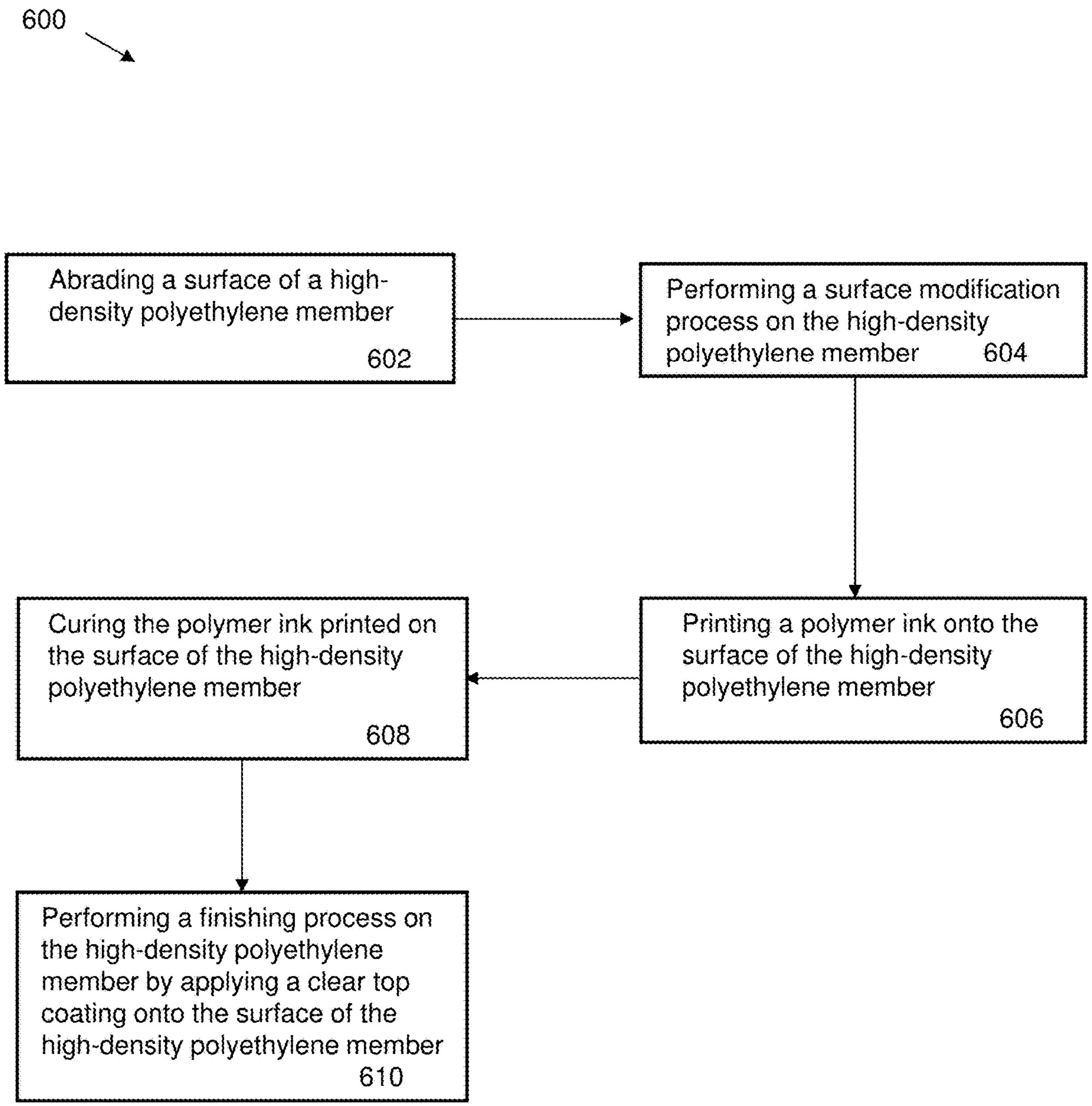
FIG. 6 is a flow diagram illustrating a sample method for conducting a UV/LED printing and finishing process according to an embodiment of the present disclosure.

Notably, the system 100 may execute and/or conduct the functionality as described in the method(s) that follow. In certain embodiments, a human operator may assist with one or more of the operations of the method 600. As shown in FIG. 6, an exemplary method 600 for conducting a UV/LED printing and finishing process is schematically illustrated. In particular, the method 600 may include steps for facilitating the bonding or adhering of UV/LED cured printing ink to products containing low surface energy plastics, such as, but not limited to, high-density polyethylene, thermoplastic polyolefin, polypropylene, any other low surface energy plastics, or a combination thereof. For example, the method 600 may be utilized to facilitate the bonding or adhering of UV/LED polymer ink to the surface of furniture containing high-density polyethylene, such as furniture 107 and/or furniture 117. To that end, at step 602, the method 600 may include abrading a surface of a high-density polyethylene member, such as a component of a piece of furniture. For example, the abrading of the surface may be conducted by abrading device 202, which may abrade the surface of the high-density polyethylene member by utilizing techniques, such as, but not limited to, sanding, media blasting, and/or Scotch-Brite™ abrading techniques. In certain embodiments, the abrading may be performed and/or facilitated by utilizing the abrading device 202, the first user device 102, the second user device 111, the server 140, the server 145, the server 150, the server 160, the communications network 135, the external network 165, any components of FIGS. 1-5, any combination thereof, or by utilizing any other appropriate program, network, system, or device.

Once the abrading has been conducted, the method 600 may proceed to step 604, which may include performing a surface modification process on the surface of the high-density polyethylene member. In certain embodiments, a corona surface modification process may be performed, a plasma surface modification process may be performed, and/or any other surface modification process may be performed. In certain embodiments, the surface modification processor may be performed and/or facilitated by utilizing the surface modification device 204, the first user device 102, the second user device 111, the server 140, the server 145, the server 150, the server 160, the communications network 135, the external network 165, any components of FIGS. 1-5, any combination thereof, or by utilizing any other appropriate program, network, system, or device. After performing the surface modification process, the method 600 may proceed to step 606, which may include feeding the member to a printer, and printing and/or depositing a polymer ink onto the surface of the high-density polyethylene member. The polymer ink may be printed onto the surface of the high-density polyethylene member such that a decorate pattern is created on the surface of the member and/or raised images (e.g. three-dimensional images) and/or features are created on the surface of the member. In certain embodiments, the polymer ink may include nano inks, such as nano UV ink. In certain embodiments, the polymer ink may not be a traditional ink and not a solvent-based ink. In certain embodiments, the polymer ink may be a resin-like polymer. In certain embodiments, the polymer ink may be a 100% solid-based ink or other percentage solid-based ink. In certain embodiments, the polymer ink may be an acrylate/polymer, pigment blend, and may be utilized with piezoelectric inkjet printing, and may also be in liquid form. In certain embodiments, the polymer ink may include an acrylic esters blend, a dispersant, an organic pigment, and/or additives. In certain embodiments, the polymer ink may include isobornyl acrylate and diphenyl phosphine oxide. The printing may be conducted by printer 206, which may be a UV/LED hybrid printer, a UV/LED flatbed printer, any other type of printer, or a combination thereof. In certain embodiments, the printing may be performed and/or facilitated by utilizing printer 206, the first user device 102, the second user device 111, the server 140, the server 145, the server 150, the server 160, the communications network 135, the external network 165, any components of FIGS. 1-5, any combination thereof, or by utilizing any other appropriate program, network, system, or device.

At step 608, the method 600 may include curing the polymer ink printed and/or deposited onto the surface of the high-density polyethylene member. For example, the polymer ink may be cured by utilizing curing device 210, which may be a UV lamp that is configured to cure the deposited polymer ink. In certain embodiments, the curing device 210 may be a mercury and/or infrared curing device. In certain embodiments, the curing may be performed and/or facilitated by utilizing the curing device 210, the first user device 102, the second user device 111, the server 140, the server 145, the server 150, the server 160, the communications network 135, the external network 165, any components of FIGS. 1-5, any combination thereof, or by utilizing any other appropriate program, network, system, or device. Once the polymer ink printed and/or deposited onto the surface of the high-density polyethylene member is cured, the method 600 may proceed to step 610. At step 610, the method 600 may include performing a finishing process on the surface of the high-density polyethylene member. The finishing process may be conducted by applying a clear top coating onto the surface of the high-density polyethylene member, such as by utilizing coating device 208. In certain embodiments, the clear top coating may be an inorganic clearcoat, which may be a glass coat and/or ceramic clearcoat. In certain embodiments, the clear top coating may be UV resistant, scratch resistant, and/or abrasion resistant. In certain embodiments, the top coating may be free from volatile organic compounds, and may be configured to be 1 ml of coating or less. In certain embodiments, the clear top coating may comprise silicon dioxide, silicon carbide, titanium nitride, additives, or a combination thereof. In certain embodiments, the finishing process may be performed and/or facilitated by utilizing the coating device 208, the first user device 102, the second user device 111, the server 140, the server 145, the server 150, the server 160, the communications network 135, the external network 165, any components of FIGS. 1-5, any combination thereof, or by utilizing any other appropriate program, network, system, or device. Once the coating is applied, the method 600 may include leaving the clear top coating to cure for a period of time. In certain embodiments, the clear top coating may be force cured by utilizing a heat tunnel. In certain embodiments, the coating may be cured by exposing the applied clear top coating to air and/or moisture. The method 600 may be repeated as necessary as additional low surface energy plastic products, componentry, furniture and/or other objects need to be treated. Notably, the method 600 may further incorporate any of the features and functionality described for the system 100, any other method disclosed herein, or as otherwise described herein.

The systems and methods disclosed herein may include additional functionality and features. For example, the systems and methods may be effective on thermoplastic polyolefin, polypropylene, and/or any other plastics. In certain embodiments, the systems and methods may conduct the printing by utilizing hybrid UV/LED printers that are configured to apply the polymer inks (or other coatings) to the surface of an object such that three-dimensional images are printed onto the surface of the object, decorative patterns are deposited onto the surface of the object, or a combination thereof. In certain embodiments, the systems and methods may be utilized in not only the furniture industry, but also, other industries, such as, but not limited to, the transportation industry, the automotive industry, the marine industry, the aviation industry, the heavy equipment industry, the building materials industry, the signage industry, the institutional and industrial markets, any other industries, or a combination thereof. In certain embodiments, the systems and methods may incorporate water transfer printing and/or hydro printing during the printing and/or finishing processes (or other processes) to create additional decorative designs and images other than what flatbed printing and/or hybrid UV/LED printing can achieve.

The systems and methods disclosed herein may include further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 over time based on the data, metadata, operations, and/or other information provided and/or generated in the system 100, such as during the abrading, surface modification, printing, curing, and/or the finishing processes, a reduced amount of computer operations need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, upon initiation of any of the processes described in the present disclosure, any device in the system 100 may transmit a signal to a computing device receiving or processing the requests, operations, and/or other data that only a specific quantity of computer processor resources (e.g. processor clock cycles, processor speed, etc.) may be devoted to processing and/or recording the operations, information, and/or other data, and/or any other operation conducted by the system 100, or any combination thereof. For example, the signal may indicate a number of processor cycles of a processor may be utilized to conduct the abrading or printing processes, and/or specify a selected amount of processing power that may be dedicated to conducting any of the operations performed by the system 100 or method. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 7:
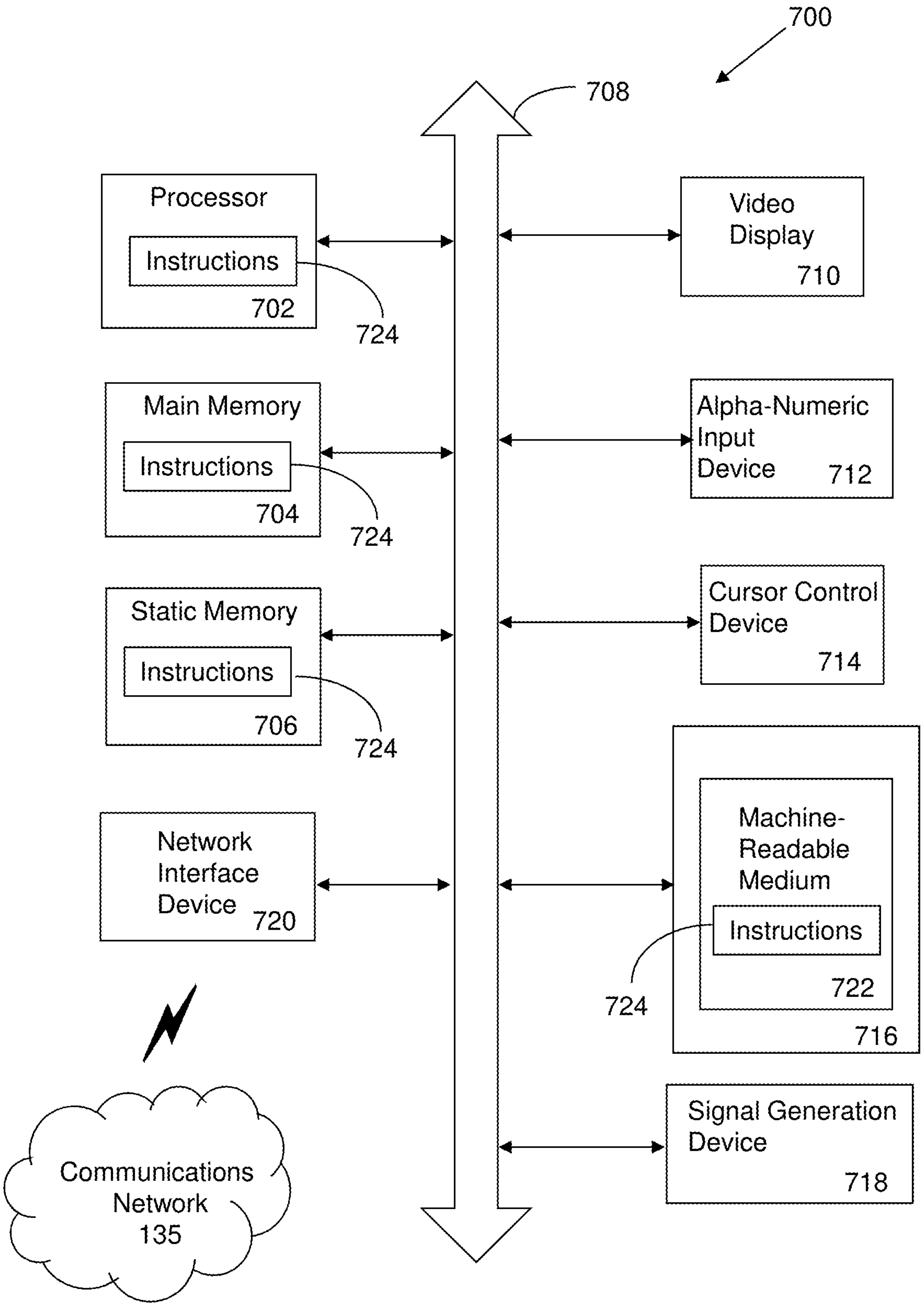
FIG. 7 is a schematic diagram of a machine in the form of a computer system within which a set of instructions, when executed, may cause the machine to perform any one or more of the methodologies or operations of the systems and methods for conducting UV/LED printing and finishing processes.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by initiating and completing various steps of the method 600, initiating and completing various operative functionality of each of the components of the system 100, by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, the external network 165, the abrading device 202, the surface modification device 204, the printer 206, the coating device 208, the curing device 210, any of the components of FIGS. 1-5, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 135, another network, or a combination thereof, can send or receive voice, video or data, and communicate over the communications network 135, another network, or a combination thereof, using the instructions. The instructions 724 may further be transmitted or received over the communications network 135, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:

a surface modification device configured to perform a surface modification process on a surface of a high-density polyethylene member to increase an adhesion capability of the high-density polyethylene member;

a printer configured to print a polymer ink onto the high-density polyethylene member after the surface modification process is performed;

a first curing device configured to cure the polymer ink printed onto the surface of the high-density polyethylene member;

a coating device configured to apply a clear top coating onto a portion of the high-density polyethylene member printed with the polymer ink; and a second curing device comprising a heat tunnel configured to cure the clear top coating applied onto the portion of the high-density polyethylene member by utilizing the heat tunnel.

2. The system of claim 1, further comprising an abrading device configured to abrade the surface of high-density polyethylene member via sanding, media blasting, or a combination thereof.

3. The system of claim 1, wherein the surface modification process comprises a corona-based surface modification process, a plasma surface modification process, or a combination thereof.

4. The system of claim 1, further comprising a first user device, a second user device, a communications network, or a combination thereof, configured to activate, instruct, and control the surface modification device, the first curing device, the second curing device, the coating device, or a combination thereof.

5. The system of claim 1, wherein the printer is configured to print the polymer ink onto the high-density polyethylene member using an ultraviolet light emitting diode lamp.

6. The system of claim 1, wherein the polymer ink comprises a nano ultraviolet ink.

7. The system of claim 1, wherein the printer is configured to print the polymer ink onto the high-density polyethylene member in a manner that creates a raised three-dimensional polymer ink coating on the surface of the high-density polyethylene member.

8. The system of claim 1, wherein the curing device comprises a mercury curing device, an infrared curing device, or a combination thereof.

9. The system of claim 1, wherein the printer comprises a hybrid ultraviolet light emitting diode printer.

10. The system of claim 1, wherein the surface modification device is configured to perform the surface modification process on a low-surface energy plastic member comprising thermoplastic polyolefin, polypropylene, or a combination thereof.

11. The system of claim 1, wherein the clear top coating comprises silicon dioxide, silicon carbide, titanium nitride, or a combination thereof.

12. The system of claim 1, wherein an adhesion promoter, an adhesion primer, or a combination thereof are applied to the surface after performing the surface modification process.

13. The system of claim 1, wherein the polymer ink comprises an acrylic esters blend, a dispersant, an organic pigment, an additive, or a combination thereof.

14. The system of claim 1, wherein the clear top coating is further cured by exposing the clear top coating to air, moisture, or a combination thereof.

15. An apparatus, comprising:

a surface modification device configured to perform a surface modification process on a surface of a high-density polyethylene member to alter an adhesion capability of the high-density polyethylene member;

a printer configured to print a polymer ink onto the high-density polyethylene member after the surface modification process is performed;

a first curing device configured to cure the polymer ink printed onto the surface of the high-density polyethylene member;

a coating device configured to apply a top coating onto a portion of the high-density polyethylene member printed with the polymer ink; and a second curing device comprising a heat tunnel configured to cure the top coating applied onto the portion of the high-density polyethylene member.

* * * * *